(12) United States Patent
Hortrich et al.

(10) Patent No.: US 10,350,980 B2
(45) Date of Patent: Jul. 16, 2019

(54) FRAME CONSTRUCTION FOR A GLASS PANE AND METHOD FOR THE PRODUCTION THEREOF

(71) Applicant: BBG GMBH & CO. KG, Mindelheim (DE)

(72) Inventors: Gerhard Hortrich, Mindelheim (DE); Bernhard Satzger, Mindelheim (DE)

(73) Assignee: BBG GMBH & CO. KG (DE)

( * ) Notice: Subject to any disclaimer, the term of this patent is extended or adjusted under 35 U.S.C. 154(b) by 54 days.

(21) Appl. No.: 15/516,464

(22) PCT Filed: May 4, 2015

(86) PCT No.: PCT/EP2015/059754
§ 371 (c)(1),
(2) Date: Apr. 3, 2017

(87) PCT Pub. No.: WO2016/050370
PCT Pub. Date: Apr. 7, 2016

(65) Prior Publication Data
US 2018/0236854 A1    Aug. 23, 2018

(30) Foreign Application Priority Data
Oct. 3, 2014   (DE) .................. 10 2014 114 414

(51) Int. Cl.
| | |
|---|---|
| *B60J 7/043* | (2006.01) |
| *B60J 10/82* | (2016.01) |
| *B60J 7/02* | (2006.01) |
| *B60J 7/00* | (2006.01) |
| *B29C 45/00* | (2006.01) |

(52) U.S. Cl.
CPC .............. *B60J 7/043* (2013.01); *B60J 7/00* (2013.01); *B60J 7/022* (2013.01); *B60J 10/82* (2016.02); *B29C 45/0001* (2013.01)

(58) Field of Classification Search
CPC .. B60J 10/82; B60J 7/043; B60J 7/022; B29C 45/0001
See application file for complete search history.

(56) References Cited

U.S. PATENT DOCUMENTS

| | | | |
|---|---|---|---|
| 4,541,457 A | 9/1985 | Blenkush | |
| 5,723,196 A * | 3/1998 | Cornils | ............. B29C 45/14434 428/122 |
| 2006/0232093 A1* | 10/2006 | Boehm | ............. B32B 17/10018 296/96.21 |
| 2013/0300108 A1 | 11/2013 | Frick | |

* cited by examiner

*Primary Examiner* — D Glenn Dayoan
*Assistant Examiner* — Melissa A Black
(74) *Attorney, Agent, or Firm* — Greg M. Popowitz; Assouline & Berlowe, P.A

(57) ABSTRACT

The invention relates to a frame construction (10) for a pane (12), comprising a plastic frame (16) surrounding the pane (12) in the edge region, and at least one metal carrier (14) that is at least partially embedded into the plastic frame (16), wherein at least one spacer (20) is provided between the metal carrier (14) and the pane (12). According to the invention, in order to produce a cost-effective, reliable connection between the carrier (14) and the pane (12), the spacer (20) is formed by at least one plastic layer (20), plastic bead (20) or plastic band (20) applied to the carrier (14) and/or the pane (12) by means of an application device (30).

20 Claims, 3 Drawing Sheets

FRAME CONSTRUCTION FOR A GLASS PANE AND METHOD FOR THE PRODUCTION THEREOF

The invention relates to a frame construction for a glass pane according to the preamble of claim 1, and to a method for the production thereof according to claim 18.

A frame construction of this type is known from DE 198 08 113 A1. Therein, the frame construction comprises an injected or foamed polymer material, which is generally made of polyurethane. In so doing, a support part made of metal is simultaneously encapsulated therewith by injected or foamed material. A thin layer of polyurethane is also present between the support part and the glass pane, and in this case serves as a spacer between the support part and the glass pane. In that context, the separation between the support part and the glass pane in the injection or foaming, and limiting of the inward foam flow must be brought about by complex mounts and seals on the tool.

It is also known to manually place lengths of a foam strip onto a metallic support part prior to foam-encapsulation with a glass pane, which prevents direct contact between the support and the glass pane and thus avoids stress concentrations which, in extreme cases, could cause the glass to break. In the case of a relatively large glass cover with multiple holding parts, the workload for manual application of the foam strip is very time-consuming.

Manual application is subject to errors and is therefore also not sufficiently reliable for mass production.

The invention has the object of specifying a frame construction and a method for the production thereof, by means of which the pane is connected to at least one support simply, cost effectively and reliably.

This object is achieved with a frame construction having the features of claim 1. Advantageous embodiments of the invention are specified in the dependent claims. A method particularly well-suited to the production of such a frame construction is specified in claim 18.

According to the invention, the spacer consists of at least one polymer layer or polymer bead, applied to the support and/or the pane by means of an application device. Application by means of an application device means that the polymer layer or polymer bead is applied substantially evenly and rapidly, and, compared to the prior art mentioned in the introduction, the proportion of costly manual work is reduced almost to zero or is even dispensed with completely.

It is advantageously provided that the at least one polymer layer or polymer bead is made of a polyurethane and/or of a silicone. The at least one polymer layer effectively protects the glass pane from the transmission of vibrations and from pressure concentrations, such as would arise in the case of direct bearing on a metallic holding part and could cause destruction of the glass pane, in particular in the case of laminated glass or toughened glass. In that context, the polymer layer is applied just punctually, partially, in part regions or circumferentially around the entire bearing surface. The pane can also consist of a polymer pane, for example made of polycarbonate (PC).

The polymer layer is preferably applied by means of an automatic device which in particular is activated after the glass pane and/or the metallic holding parts have been set in place in a foam-encapsulation device. The device for applying the polymer layer is preferably combined with a device which applies a primer to those parts of the glass pane which are subsequently encapsulated by the polyurethane foam. In that context, the polymer layer is particularly preferably applied by means of at least one additional nozzle, in parallel with application of the primer.

It is particularly preferably provided that at least two parallel polymer beads are applied as spacers to the support and/or to the glass pane. The two parallel polymer beads are preferably made of the same material or of different materials and applied simultaneously or in sequence by means of the application device. Thus, for example, a first polymer bead is made of polyurethane while a second polymer bead —arranged parallel thereto —is made of silicone.

The spacers in the form of the polymer beads or of the applied polymer layer preferably simultaneously serve, when they are arranged circumferentially, to seal the inner region of the glass pane such that, during encapsulation by injected or foamed material, polymer material of the polymer frame cannot penetrate to the inside of the glass pane. This provides savings in terms of additional seals on the tool for encapsulation by injected or foamed material, and in terms of the work involved in cleaning and replacing them.

There follows a more detailed explanation of exemplary embodiments of the invention with reference to the drawings, in which.

Figure 1:
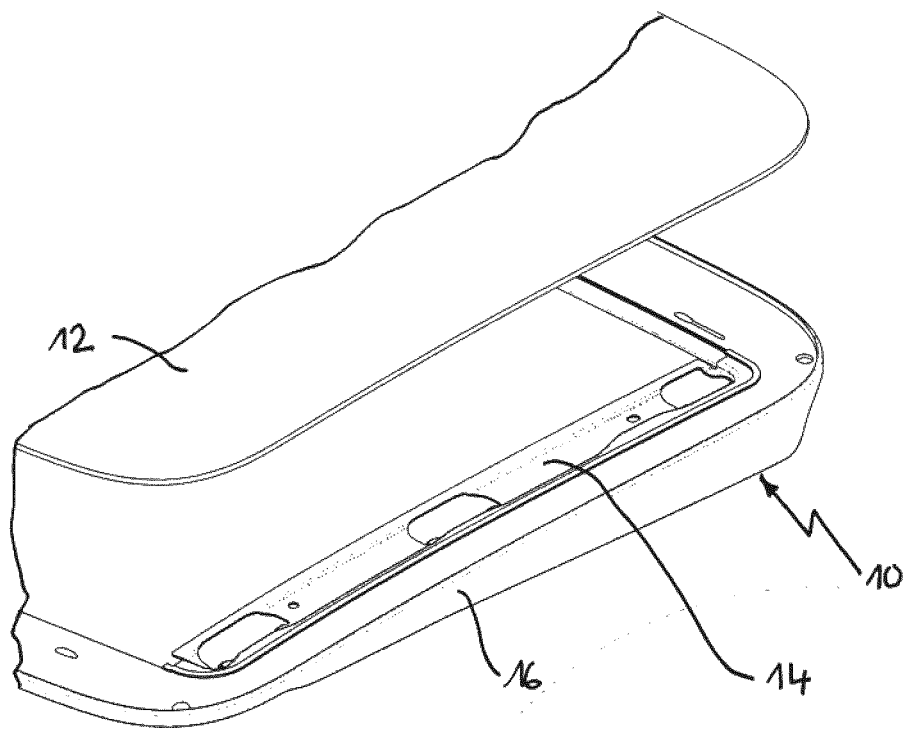
FIG. 1 is an exploded view of the lateral region of a cover of a sunroof.

FIG. 1 is an exploded view of a frame construction 10 of a cover of a vehicle sunroof. In this view, the pane 12, comprised of a glass pane, is shown in the raised position in order to show the parts thereunder, in particular a metallic support 14. In the finished state, the glass pane 12 and the metallic support 14 are surrounded at the edge region of the glass pane 12 by a polymer frame 16 which is created in a tool by encapsulation with injected or foamed material. The pane 12 can also be comprised a polymer pane, for example made of polycarbonate (PC). The support 14 can also be comprised of a polymer part, preferably a fiber-reinforced polymer part, such as a carbon part.

The metallic support 14 serves to stiffen the overall frame construction 10 and to attach the finished component to adjacent parts with a downward-curved lower leg 144. For example, in the case of a cover of a sunroof, these adjacent parts comprise of the actuation mechanism for raising and/or retracting the cover. The polymer frame 16 establishes a material connection between the glass pane 12 and the at least one support 14.

So the glass pane 12 does not sit directly on the support 14, spacers 20, which decouple the glass pane 12 from the support 14 and thus prevent the transmission of vibrations and prevent stress concentrations which in extreme cases could cause the glass pane 12 to break, are provided at least in the bearing regions 18.

Figure 2:
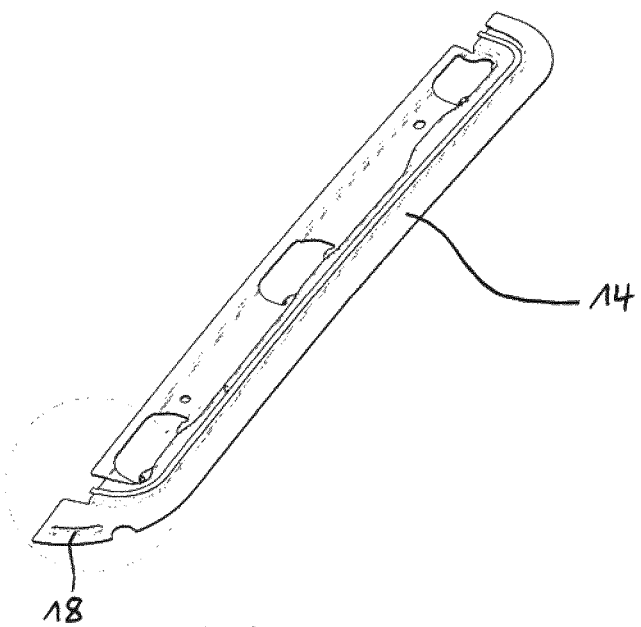
FIG. 2 is a detailed view of a support.
Figure 3:
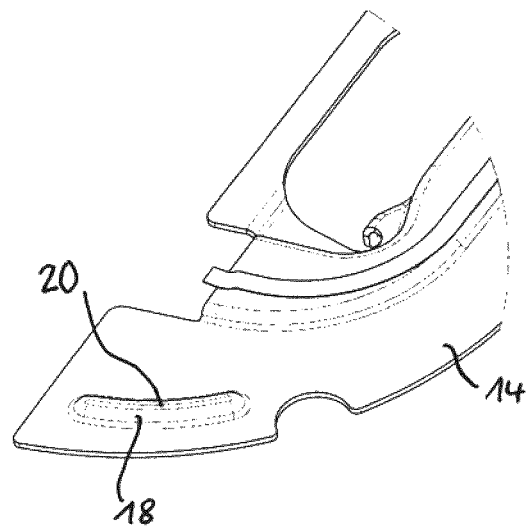
FIG. 3 is an enlarged view of the front region of the support.

FIGS. 2 and 3 show enlarged views of a bearing region 18 in which, in this example, a spacer 20 in the form of a short polymer bead is applied only in this region.

Figure 4:
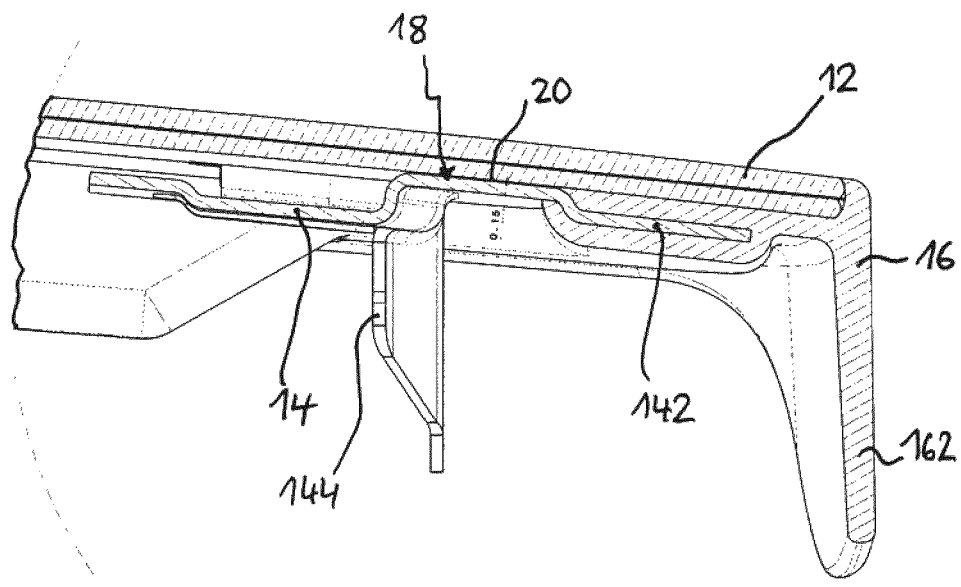
FIG. 4 shows a cross section through the edge region of a sunroof cover, with a polymer layer as a spacer.

In the exemplary embodiment shown in FIG. 4, the bearing region 18 is formed by an upwardly curved surface of the support 14. A polymer layer 20 is applied to this surface of the support 14 as a spacer, and the underside of the glass pane 12 sits on this spacer. The glass pane 12 and the support 14 are joined by means of a polymer frame 16. The polymer frame 16 is created in a tool by encapsulating the edge region of the glass pane 12 and that of the outer part of the support 14 in injected or foamed material. In that context, the tool is designed such that the polymer material of the polymer frame 16 extends in the region extending outward from the bearing region 18, between an outer leg 142 of the support 14 and the underside of the glass pane 12, and also surrounds the outer leg 142 from below. The polymer material of the polymer frame 16 also surrounds the lateral edge of the glass pane 12 and forms in the edge region, with a downward-continuing projection, a side skirt 162 of the sunroof cover.

Figure 5:
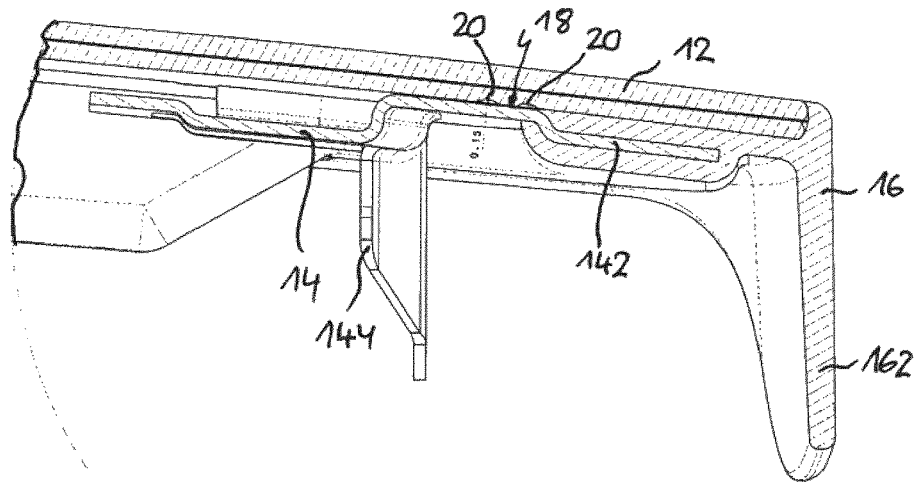
FIG. 5 is a variant of FIG. 4, with two spacers applied to the support.

In a first variant of FIG. 4, shown in FIG. 5, the spacer 20 is not formed by a continuous polymer layer, but rather by two parallel polymer beads which are applied to the top side of the bearing region 18 of the support 14, are preferably provided circumferentially over the entire length of the support 14 and thus, in addition to their function of decoupling the glass pane 12 from the support 14, also serve to seal against the polymer material of the polymer frame 16 during encapsulation in injected or foamed material. By virtue of this seal, the polymer material penetrating between the outer leg 142 and the underside of the glass pane 12 is prevented from penetrating further inward into the visible region of the glass pane 12.

Figure 7:
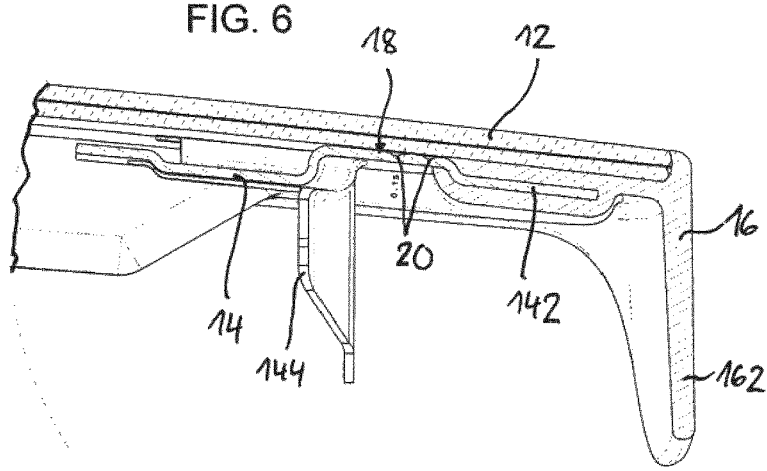
FIG. 7 is another embodiment of FIGS. 4 and 5, with two spacers applied to the pane.

The embodiment shown in FIG. 7 contrasts with FIG. 5 in that the two parallel polymer beads, as spacer 20, have been applied to the underside of the glass pane 12 prior to joining with the support 14.

It is also possible to have mixed forms, in which at least one polymer bead is applied to the support 14 and at least one other polymer bead is applied to the underside of the glass pane 12. The polymer beads, as spacer 20, can be made of the same material or different materials. One preferred spacer 20 material for the polymer beads or the polymer layer is polyurethane. Another preferred spacer 20 material for the polymer beads or the polymer layer is silicone.

Figure 6:
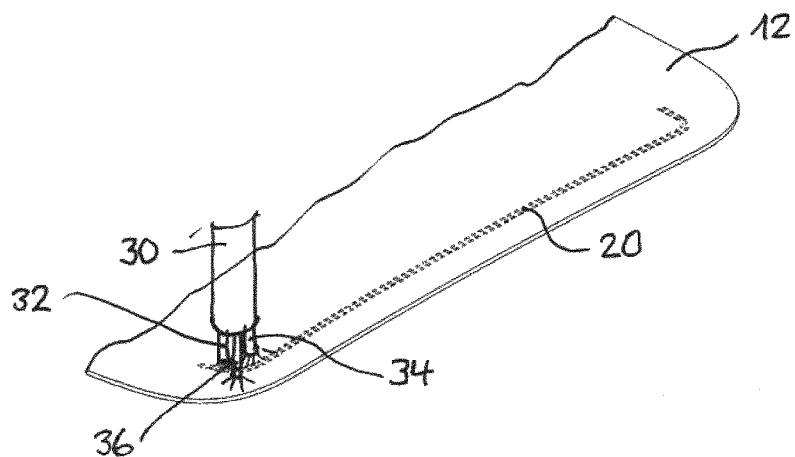
FIG. 6 shows the edge region of a pane with a schematically illustrated application device.

FIG. 6 shows an application device 30 which in particular comprises an application robot and which, by means of a first nozzle 32 and a second nozzle 34, applies the two parallel spacer 20 polymer beads to the upward-oriented underside of the glass pane 12. In that context, a primer which improves adhesion of the polymer material of the polymer frame 16 during the subsequent encapsulation in injected or foamed material can simultaneously be applied to the outer region of the glass pane 12 by means of a primer nozzle 36 arranged on the application device 30.

The encapsulation by means of the injected or foamed polymer frame 16 takes place in a two-part or multi-part molding tool (not shown), into the lower tool half of which the glass pane 12 is preferably inserted first, with the top side facing down, and then multiple supports 14 are positioned on attachment elements of the upper molding tool. Then, an upper tool half is lowered and then, together with the lower tool half, encloses in the edge region a cavity which corresponds to the shape of the polymer frame 16. The polyurethane is introduced in liquid form into this cavity and is foamed to form the polymer frame 16. Foam-encapsulation in the reverse position, corresponding to the position of the pane during use, is also possible with a corresponding configuration of the molding tool.

Instead of the polyurethane foam, the polymer frame 16 can also be produced using other materials such as, but not limited to, thermoplastics, e.g. thermoplastic elastomers (TPE), polyvinyl chloride (PVC) or others.

During encapsulation in injected material, the tool halves are split into a nozzle side and an ejector side, which are used horizontally or vertically depending on the machine type.

The term "polymer bead" encompasses all geometric cross sections. These can for example, as shown, be semi-circular, triangular or rectangular.

The term "polymer strip" encompasses in particular strips provided with an adhesive layer on the underside and having a foam-like structure above.

LIST OF REFERENCE SIGNS

10 Frame construction
12 Pane (e.g. glass pane)
14 Support
142 Outer leg (of 14)
144 Lower leg (of 14)
16 Polymer frame
162 Side skirt
18 Bearing region
20 Spacer
30 Application device
32 first Nozzle (for 20)
34 second Nozzle (for 20)
36 primer Nozzle (for primer)

The invention claimed is:

1. A frame construction for a pane, comprising a polymer frame surrounding the pane in the edge region and at least one support at least partially embedded in the polymer frame, wherein at least one spacer is provided between the support and the pane, wherein the spacer comprises at least one polymer layer or polymer bead applied to the support and/or the pane by means of an automatic application device only in a bearing region of the support, wherein the at least one polymer layer or polymer bead serve to seal against a polymer material of the polymer frame.

2. The frame construction as recited in claim 1, wherein the at least one spacer is made of at least one of the following: polyurethane and silicone.

3. The frame construction as recited in claim 1, wherein the polymer frame is made of polyurethane.

4. The frame construction recited in claim 2, wherein the polymer frame is made of polyurethane.

5. The frame construction as recited in claim 1, wherein the at least one spacer is arranged on the support.

6. The frame construction as recited in claim 2, wherein the at least one spacer is arranged on the support.

7. The frame construction as recited in claim 3, wherein the at least one spacer is arranged on the support.

8. The frame construction as recited in claim 1, wherein the at least one spacer is arranged on the pane.

9. The frame construction as recited in claim 2, wherein the at least one spacer is arranged on the pane.

10. The frame construction as recited in claim 3, wherein the at least one spacer is arranged on the pane.

11. The frame construction as recited in claim 1, wherein the at least one spacer is arranged punctually.

12. The frame construction as recited in claim 2, wherein the at least one spacer is arranged punctually.

13. The frame construction as recited in claim 3, wherein the at least one spacer is arranged punctually.

14. The frame construction as recited in claim 1, wherein the at least one spacer is arranged circumferentially.

15. The frame construction as recited in claim 2, wherein the at least one spacer is arranged circumferentially.

16. The frame construction as recited in claim 1, wherein at least two mutually parallel spacers are provided.

17. The frame construction as recited in claim 2, wherein at least two mutually parallel spacers are provided.

18. A method for producing a frame construction, comprising:
applying at least one polymer layer or polymer bead or a polymer strip to part regions of a bearing region of the at least one support and/or a pane by means of an automatic application device,
bringing the at least one support and the pane to sit against one another in a tool with the spacers between them, and
creating a polymer frame around the support and pane using injection-molding or foaming wherein the at least one polymer layer or polymer bead or polymer strip serve to seal against a polymer material of the polymer frame.

19. The method as recited in claim 18, wherein the automatic application device has at least one nozzle for applying the polymer layer or the polymer bead or a polymer strip, and at least one primer nozzle for applying a primer in the edge region of the pane prior to encapsulation in injected or foamed material.

20. An automatic application device provided with at least one nozzle for robotically applying at least one polymer layer and/or polymer bead, or a device for robotically applying a polymer strip to an edge region of a pane, the automatic application device comprising at least one further nozzle for robotically applying at least a primer to the edge region of the pane.

* * * * *